US010721201B2

(12) United States Patent
Lukács et al.

(10) Patent No.: US 10,721,201 B2
(45) Date of Patent: *Jul. 21, 2020

(54) SYSTEMS AND METHODS FOR GENERATING A MESSAGE TOPIC TRAINING DATASET FROM USER INTERACTIONS IN MESSAGE CLIENTS

(71) Applicant: Google LLC, Mountain View, CA (US)

(72) Inventors: László Lukács, Adllswil (CH); Karol Kurach, Zurich (CH); Balint Miklos, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,628

(22) Filed: Sep. 10, 2019

(65) Prior Publication Data
US 2020/0007486 A1 Jan. 2, 2020

Related U.S. Application Data

(63) Continuation of application No. 14/555,312, filed on Nov. 26, 2014, now Pat. No. 10,454,871.

(51) Int. Cl.
*H04W 4/12* (2009.01)
*H04L 12/58* (2006.01)

(52) U.S. Cl.
CPC ............. *H04L 51/22* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 2004/0143636 A1* | 7/2004 | Horvitz | G05B 19/404 709/207 |
| 2010/0082751 A1* | 4/2010 | Meijer | G06F 15/16 709/206 |
| 2012/0284273 A1* | 11/2012 | Keohane | G06F 3/04817 707/737 |
| 2013/0086180 A1 | 4/2013 | Midgen | |
| 2014/0344387 A1* | 11/2014 | Alspector | H04L 51/12 709/206 |
| 2015/0039704 A1 | 2/2015 | Kursun | |
| 2016/0119268 A1* | 4/2016 | Sharp | H04L 51/12 709/206 |

* cited by examiner

*Primary Examiner* — Sargon N Nano
*Assistant Examiner* — Christopher B Robinson
(74) *Attorney, Agent, or Firm* — Botos Churchill IP Law

(57) ABSTRACT

Systems and methods for classifying messages are provided. Each message in a plurality of messages is classified, thereby independently identifying a message category in a set of message categories for each respective message in the plurality. The plurality of messages is delivered to a plurality of recipients with a designation of the message category of each respective message in the first plurality of messages. A plurality of recipient initiated message interaction events for messages in the first plurality of messages over a predetermined period of time is collected from the plurality of recipients. A message categorization dataset is then constructed from (i) the first plurality of messages, (ii) the designation of the message category of each respective message in the subset of the first plurality of messages, and (iii) the plurality of recipient initiated message interaction events. This message categorization dataset is used to train or evaluate a message classifier.

20 Claims, 10 Drawing Sheets

Recipient initiated message interaction monitoring data store 182

| | 114 | 192 | |
|---|---|---|---|
| | MSG 1 | Recipient initiated message interaction type | 194-1 |
| | MSG 2 | Recipient initiated message interaction type | 194-2 |
| | MSG 3 | Recipient initiated message interaction type | 194-3 |
| | ⋮ | ⋮ | |
| | MSG V | Recipient initiated message interaction type | 194-V |

Figure 3B

Message categorization dataset 315

| | 114 | 196 | 198 | |
|---|---|---|---|---|
| | MSG 1 | Weight for MSG 1 | Category for MSG 1 | 199-1 |
| | MSG 2 | Weight for MSG 2 | Category for MSG 2 | 199-2 |
| | MSG 3 | Weight for MSG 3 | Category for MSG 3 | 199-3 |
| | ⋮ | ⋮ | ⋮ | |
| | MSG W | Weight for MSG W | Category for MSG W | 199-W |

Figure 3C

SYSTEMS AND METHODS FOR GENERATING A MESSAGE TOPIC TRAINING DATASET FROM USER INTERACTIONS IN MESSAGE CLIENTS

CROSS-REFERENCE TO RELATED APPLICATIONS

The present application is a continuation of U.S. patent application Ser. No. 14/555,312, filed Nov. 26, 2014, the entire disclosure of which is hereby incorporated herein by reference.

TECHNICAL FIELD

This specification describes technologies relating to an email system in general, and specifically to systems and methods for generating a message topic training dataset from user interactions in message clients. This message topic training dataset can then be used to train or evaluate the performance of a test message classifier.

BACKGROUND

Electronic messaging, such as through email, is a powerful communication tool for the dissemination of information. However, the ease of sending messages can result in a recipient receiving large numbers of messages in a single day. This is because, in addition to message sent by actual people, a recipient may receive messages generated by machines from third party services such as airlines, invitation generating companies, courier services, and social media sites. These messages may include confirmations, notifications, promotions, social media updates, and messages from collaboration system.

To address the large number of messages received by recipients, modern messaging systems attempt to classify messages for recipients using a set of message categories. That is, as part of the delivery process of messages to recipients, the messaging system reviews the messages and determines which category, from a set of message categories, to assign the message. However, the appropriate classification of messages into such categories remains a challenging problem. One reason for this is that there is a limited amount of information in messages (by which to categorize such messages). Another reason message categorization remains a challenge is due to the often idiosyncratic, non-orthogonal, and highly subjective characteristics of the message categories themselves. In short, the messages to be categorized often have very little information that can be used to reliably categorize them, and the message categories within any given set of message categories often have features that overlap with other message categories in the set.

The above identified technical problems are reduced or eliminated by the systems and methods disclosed herein.

SUMMARY

Technical solutions (e.g., computing systems, methods, and non-transitory computer readable storage mediums) for classifying messages are provided in the present application. Since there isn't a "ground truth" for message categories, the disclosed systems and methods use a proxy for the true category of messages in order to apply supervised learning. In some embodiments such proxies are based on the classifier output from a traditional classifier in combination with user interaction data.

For instance, some embodiments make use of the observation of an absence of corrections in a given set of messages. To this end, a list of senders is maintained that generate messages that are consistently categorized by a classifier into the same set of categories, generate a lot of messages, and for which there are very few recipient corrections to such categorization. The classification of these messages can be more trusted than the classification of other messages. As such, messages from this list of senders can be used as the basis of a message categorization dataset in which the message category of each message is trusted. This message categorization dataset can be used to train a message classifier or evaluate the performance of such a message classifier.

As another example, some embodiments make use of the observation of a presence of corrections to the message category by message recipient. That is, those messages received by message recipients corrected into some category X from category Y, are presumed to have higher confidence that such message are really category X than the confidence that such messages are category Y as predicted by a message classifier. This is because user judgment of message categories is valued in such instances for the judgment of an automated classifier. Messages that have been recategorized in this way by message recipients can be used as the basis of a message categorization dataset in which the message category of each message is trusted. This message categorization dataset can be used to train or evaluate the performance of a message classifier.

As another example, some embodiments make use of the presence of negative recipient interactions with received messages to gain trust that the message categories assigned by an automated classifier to such received messages is correct. The presumption in such examples is that a user would not interact with such messages if their classifications were not correct. Examples of such positive interaction signals include, but are not limited to, the time spent reading such messages, the application of importance markers to such messages, as well as actions such as replying to or forwarding of such messages. From these actions, implicit agreement with the classifier categorization of such messages can be inferred. Messages that have been verified in this implicit way by message recipients can be used as the basis for a message categorization dataset in which the message category of each message is trusted. This message categorization dataset can be used to train or measure the performance of a message classifier.

In some embodiments, messages that have been identified by any one of the above-identified ways as trusted are combined into a single message categorization dataset. In some embodiments, rather than simply applying a binary filter to each message, such that the message is either excluded from or included in the message categorization dataset, the above-identified information is used to assign a weight to each message in the message categorization dataset. Those messages whose message categories are more trusted are upweighted relative to those messages that are less trusted. In some embodiments, messages that are upweighted have greater influence during classifier training than those messages that are less trusted.

The present disclosure is not limited to identifying messages whose message categories are trusted. In fact, methods for identifying messages whose message categories are not trusted are also provided. As an example, some embodiments make use of the presence of negative recipient interactions with received messages to determine that the message categories assigned by an automated classifier to such received messages are not correct. The presumption is in such embodiments that a user would not incur these negative interactions with such messages if their classification were correct. Examples of such negative interaction signals include, but are not limited to, ignoring such messages, or the deletion of such messages. From these actions, implicit disagreement with the classifier categorization of such messages can be inferred. Messages that have been discounted in this implicit way by message recipients can be used as the basis of excluding them from (or downweighting them in) a message categorization dataset in which the message category of each message is trusted, thereby enriching the message categorization dataset for messages whose message categorizations are trusted. This message categorization dataset can be used to train or measure the performance of a message classifier.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

In some implementations, a method is provided for classifying messages. The method comprises, at a computer system having one or more processors, and memory storing one or more programs for execution by the one or more processors, classifying each message in a first plurality of messages. In this way, a message category in a set of message categories is independently identified for each respective message in the first plurality of messages. The first plurality of messages is delivered to a plurality of recipients with a designation of the message category of each respective message in the first plurality of messages. Typically the recipient is made aware of the message categories of these messages (e.g., by including messages or each respective message in a different message tab as illustrated in FIG. 5). A plurality of recipient initiated message interaction events is collected for messages in the first plurality of messages (e.g., over a predetermined period of time, on a recurring basis, etc.) from the plurality of recipients. A message categorization dataset is then constructed from (i) the first plurality of messages, (ii) the designation of the message category of each respective message in the plurality of messages, and (iii) and the plurality of recipient initiated message interaction events. This message categorization dataset is then used to train or measure the performance of a test message classifier. Because the message categorization dataset is enriched for trusted message categorization information, the accuracy and/or some other performance metric (e.g., a cost function) of the test message classifier is improved. In some embodiments, the initial classifying at the outset of the method is performed by a baseline message classifier that was constructed at a time prior to the classifying.

In some embodiments, the set of message categories comprises promotions, social, updates, forums, travel, finance and receipts or any subcombination thereof. In some embodiments, the set of message categories comprises priority, promotions, social, updates, and forums. In some embodiments, the set of message categories is defined by a recipient. Any categorical set of message categories may be used in the systems and methods of the present disclosure.

In some embodiments, each recipient in the plurality of recipients is associated with a client in a plurality of clients and the delivering the first plurality of messages comprises delivering each respective message in the first plurality of messages to the client in the plurality of clients that is associated with the recipient of the respective message. That is to say, in some embodiments each recipient receives messages via a client device running a messaging system.

In some embodiments, the classifying is performed by a baseline message classifier that was constructed at a time prior to the classifying and the plurality of recipient initiated message interaction events are message category correction events in which a recipient has changed the category of a message from the message category assigned by the baseline message classifier to a different message category in the set of message categories. In some such embodiments, the constructing comprises identifying a plurality of senders (i) whose messages in the first plurality of messages are consistently categorized by the baseline message classifier into the same respective message categories in the set of message categories and (ii) whose messages are associated with less than a predetermined amount of message interaction events. In other words, the messages from such senders are rarely recategorized by recipients and the automated baseline classifier typically classifies the messages from such senders into the same limited few (or single) message classification. In some embodiments, it is the messages from this plurality of senders that is used as the basis for the message categorization dataset. In other embodiments, the messages from this plurality of senders is upweighted relative to other messages in the message categorization dataset, such that the upweighted messages have greater influence on classifier training than messages that have not been upweighted. In some embodiments, messages in the first plurality of messages are consistently categorized by the baseline message classifier into the same respective message categories in the set of message categories when at least a predetermined threshold percentage of the messages (e.g., at least seventy percent, at least eighty percent, etc.) from the plurality of senders are categorized into two or less message categories in the set of message categories by the baseline message classifier. In some such embodiments, each sender in the plurality of senders has more than a threshold number of messages (e.g, more than 10 messages, more than 100 messages, etc.) in the first plurality of messages. In some such embodiments, the message categorization dataset comprises a subset of the first plurality of messages.

In some embodiments, the message categorization dataset comprises a subset of the first plurality of messages and the classifying is performed by a baseline message classifier that was constructed at a time prior to the classifying. Further, in some such embodiments, the plurality of recipient initiated message interaction events are events in which the recipient changes the category of a message from the message category assigned by the baseline message classifier to a different message category in the set of message categories. In some such embodiments, the constructing comprises selecting, for the subset of the first plurality of messages, those messages in the first plurality of messages that have undergone a recipient initiated message interaction event.

In some embodiments, the constructing comprises selecting, for a subset of the first plurality of messages, those messages in the first plurality of messages associated with a recipient initiated message interaction event. In some embodiments, the recipient initiated message interaction event comprises a recipient of a respective message in the first plurality of messages opening the respective message for at least a predetermined amount of time. In some embodiments, the recipient initiated message interaction event comprises a recipient of a respective message in the first plurality of messages assigning the respective message a priority designation. In some such embodiments, the recipient initiated message interaction event comprises a recipient of a respective message in the first plurality of messages replying to the respective message. In some embodiments, the recipient initiated message interaction event comprises a recipient of a respective message in the first plurality of messages forwarding the respective message.

In some embodiments, the message categorization dataset comprises a subset of the first plurality of messages, and the constructing comprises excluding from the subset of the first plurality of messages those messages in the first plurality of messages associated with a recipient initiated message interaction event. In some such embodiments, the classifying is performed by a baseline message classifier that was constructed at a time prior to the classifying, and the recipient initiated message interaction event comprises a recipient changing a message category of a respective message in the first plurality of messages that was assigned to the respective message by the baseline message classifier. In some such embodiments, the recipient initiated message interaction event comprises a recipient deleting a respective message in the first plurality of messages.

In some embodiments, the method further comprises classifying each message in a second plurality of messages using the test message classifier (whose performance has been measured by the message categorization dataset 315 or that was trained by this dataset 315), thereby independently identifying a message category in the set of message categories for each respective message in the second plurality of messages. Further, the second plurality of messages is delivered to the plurality of recipients with a designation of the message category of each respective message in the second plurality of messages, as respectively determined by the test message classifier.

In some embodiments, the message categorization dataset 315 is used to train a test message classifier or measure the performance of the test message classifier. In some embodiments, the test message classifier and the baseline message classifier are the same message classifier.

In some embodiments, each message in the first plurality of messages comprises an Email, short message service (SMS) text message, a multimedia messaging service (MMS) message, a file, a document, a video, an image, or an electronic conversation.

In some embodiments, the constructing a message categorization dataset comprises independently assigning a weight to a respective message in the plurality of messages based upon one or more recipient initiated message interaction events that are associated with the respective message. In some embodiments, the weight is a categorical weight, and the assigning assigns a first value to the weight when the one or more recipient initiated message interaction events are positive interactions, and the assigning assigns a second value to the weight when the one or more recipient initiated message interaction events are negative interactions. In some embodiments, the weight is a on a continuous scale, and the assigning assigns a value to the weight as a function of the one or more recipient initiated message interaction events associated with the respective message.

Another aspect of the present disclosure provides a computing system, comprising one or more processors and memory storing one or more programs to be executed by the one or more processors. The one or more programs comprise instructions for performing any of the methods disclosed herein.

Another aspect of the present disclosure provides a non-transitory computer readable storage medium storing one or more programs configured for execution by a computer. The one or more programs comprise instructions for performing any of the methods disclosed herein.

Thus, these methods, systems, and -transitory computer readable storage medium provide new, less cumbersome, more efficient ways to classify messages with better performance.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 3B illustrates a recipient initiated message interaction data store, in accordance with some implementations.

FIG. 3C illustrates a message categorization dataset, in accordance with some implementations.

DETAILED DESCRIPTION

The implementations described herein provide various technical solutions to improving the categorization of electronic messages generally, and in particular to improved methods for identified datasets that can be used to reliably train classifiers or to measure their accuracy. Details of implementations are now described in relation to the Figures.

Figure 1:
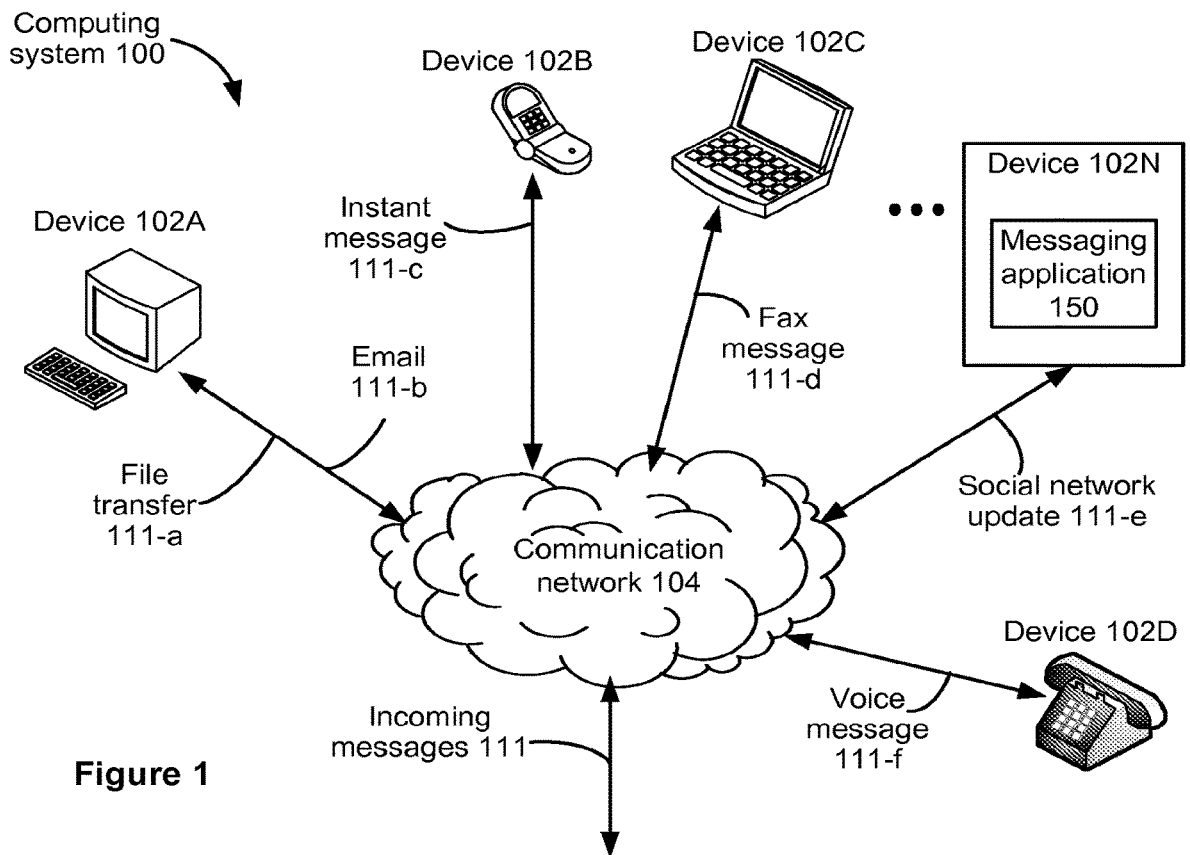
FIG. 1 is an example block diagram illustrating a computing system, in accordance with some implementations.
Figure 1:
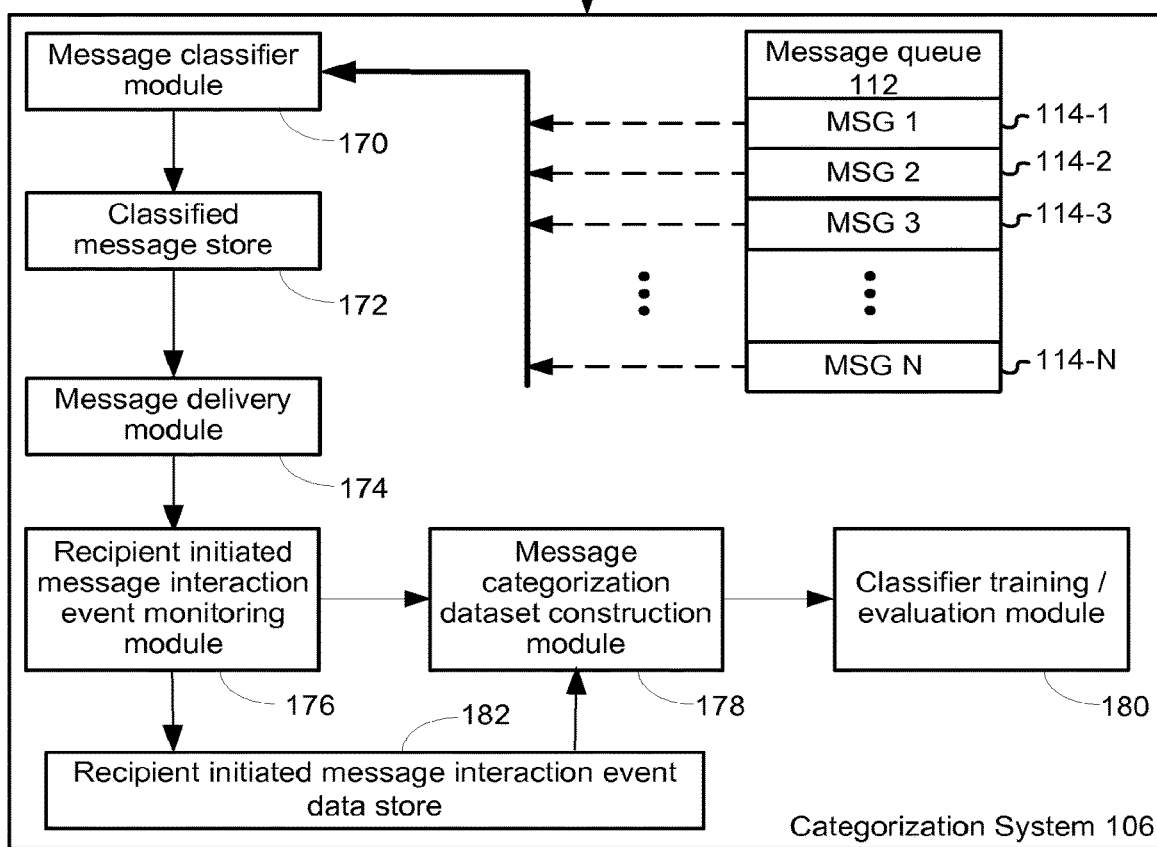

FIG. 1 is a block diagram illustrating a computing system 100, in accordance with some implementations. In some implementations, the computing system 100 includes one or more devices 102 (e.g., device 102A, 102B, 102C, 102D . . . , and 102N), a communication network 104, and a categorization system 106. In some implementations, a device 102 is a phone (mobile or landline, smart phone or otherwise), a tablet, a computer (mobile or otherwise), a fax machine, or an audio/video recorder.

In some implementations, a device 102 obtains an electronic message from (e.g., drafted or generated by) a user of the device 102, and transmits the electronic message to the categorization system 106 for displaying with other electronic messages. For example, after determining that user Jack sends an electronic message to recipient Mary, the device 102 transmits the electronic message to the categorization system 106 for delivery to the device 102 associated with recipient Mary.

In some implementations, an electronic message is a file transfer 111-a (e.g., a photo, document, or video download/upload), an email 111-b, an instant message 111-c, a fax message 111-d, a social network update 111-e, or a voice message 111-f. In some implementations, an electronic message is a calendar entry, an email, a short message service (SMS) text message, a multimedia messaging service (MMS) message, a file, a document, a video, an image, or an electronic conversation.

In some implementations, a device 102 includes a messaging application 150. In some implementations, the messaging application 150 processes incoming and outgoing electronic messages into and from the device 102, such as an outgoing electronic message sent by a user of the device 102 to another user, and a conversation message by another user to a user of the device 102. In some embodiments the messaging application 150 is an email application.

In some implementations, the communication network 104 interconnects one or more devices 102 with each other, and with the categorization system 106. In some implementations, the communication network 104 optionally includes the Internet, one or more local area networks (LANs), one or more wide area networks (WANs), other types of networks, or a combination of such networks.

With reference to FIG. 1, in some implementations, the classification system 106 includes a number of components related to the development of a message categorization dataset, including a message queue 112 that includes a plurality of messages 114-1 to 114-N, a message classifier module 170, and a classified message store 172. In some embodiments, the messages in the message queue 112 originated from users associated with devices 102 and were communicated to categorization system 106 across communication network 104. In some implementations, the message queue 112 includes different types of electronic messages, such as a file transfer 111-a (e.g., a photo, document, or video upload), an email 111-b, an instant message 111-c, a fax message 111-d, a social network update 111-e, a voice message 111-f, contact information, an indication of a document, a calendar entry, an email label, a recent search query, a suggested search query, or a web search result. In some embodiments, the messages in the message queue 112 constitute a training set of messages, such as the Enron corpus. See Klint and Yang, 2004, "The Enron corpus: A new dataset for email classification research," European Conf. Machine Learning, 217-226, which is hereby incorporated by reference. In some implementations, the categorization system 106 invokes the message classifier module 170 to classify each message in the first plurality of messages 114-1 to 114-N thereby independently identifying an initial message category in a set of message categories for each respective message in the plurality of messages.

An example of a set of message categories is {promotions, social, updates, forums, travel, finance and receipts}. Each message category in the set of message categories requires that a message have certain characteristics. A message containing a reservation may be classified as an "update" message. A message containing information about an event may be classified as a "promotion" message. If the message asks a recipient to rate something, the message may be a "social" message. In some embodiments, there is any number of additional messages categories.

By way of nonlimiting example, in some embodiments, messages that are likely to be categorized as "promotions" are newsletters, offers and other bulk messages. In some embodiments, messages that are likely to be categorized as "social" are messages originating from social networking website. In some embodiments, messages that are likely to be categorized as "updates" are confirmations, bills, and receipt messages. In some embodiments, messages that are likely to be categorized as "forum" messages are messages from online groups, discussion boards, and mailing lists. In some embodiments, messages that are likely to be categorized as "primary" are messages that do not fall into any of the other categories.

Once classified, messages in the first plurality of messages are stored in classified message store 172. In some embodiments, classified message store 172 includes only a reference to where such messages are stored (e.g., a reference to message queue or some other location where the message is stored) and the classification of the message. Messages in message store 172 are distributed to the devices 102 associated with the recipients of these messages by message delivery module 174.

Categorization system 106 further includes a recipient initiated message interaction monitoring module 176 to monitor recipient initiated message interactions that occur on devices 102. Examples of message interactions include, but are not limited to, changing the message category of messages that have been assigned by message classifier module 170, the opening of such messages, the review of such messages, as well as the forwarding or reply to such messages. Such recipient initiated message interaction is stored by categorization system 106 in recipient initiated message interaction data store 182.

Message categorization dataset construction module 178 uses the events in data store 178 to form a message categorization data set 315. The module leverages the interaction events to adjust the level of trust in initial message categorizations assigned to messages by message classifier module 170. Quantitatively, this level of trust takes either a categorical form (e.g., present or absent) or a continuous form (e.g., a continuous variable that value of which quantifies a level of trust). In the categorical form, messages in the plurality of messages whose categories are not sufficiently trusted are excluded from the message categorization data set 315 whereas those messages that are sufficiently trusted are included. In the continuous form, messages in the plurality of messages whose categories are not trusted remain in the message categorization data set 315 but receive less weight than those messages that have greater trust are included.

Figure 2:
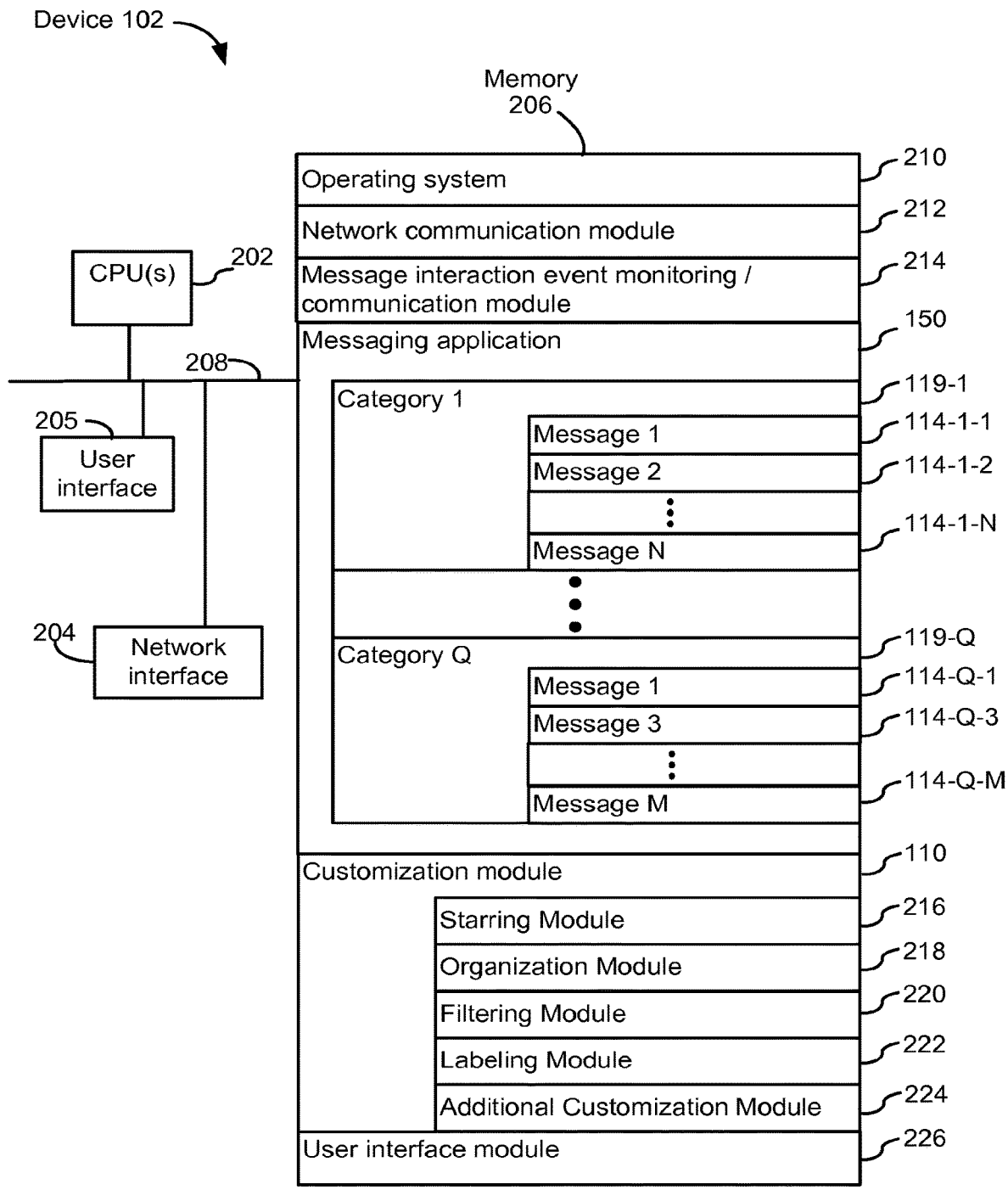
FIG. 2 is an example block diagram illustrating a computing device, in accordance with some implementations.

FIG. 2 is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM, ROM, EEPROM, flash memory, CD-ROM, digital versatile disks (DVD) or other optical storage, magnetic cassettes, magnetic tape, magnetic disk storage or other magnetic storage devices, other random access solid state memory devices, or any other medium which can be used to store desired information; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the categorization system 106 and the devices 102B ... 102N) via one or more network interfaces 204 (wired or wireless), or the communication network 104 (FIG. 1);
- a message interaction event communication module 214 for monitoring recipient initiated message interaction events and communicating them, through network communication module 212, to categorization system 106;
- a messaging application 150 for processing and displaying incoming and outgoing electronic messages, including messages 114-1-1 through 114-1-N of category 119-1, ..., messages 114-Q-1 through 114-Q-M of category 119-Q, where 1, 2, ..., Q, are the message categories in a set of message categories;
- a customization module 110; and
- an optional user interface module 226 for displaying user interface components or controls (e.g., textbox, button, radio button, drop-down list) to a user.

In some embodiments, the customization module 110 includes one or more of the following: a starring module 216 to allow a user to star a message for inclusion in a priority category; an organization module 218 to allow a user to move a message from one category to another (e.g., by dragging dropping); a filtering module 220 for allowing a user to specify a category rule for a message, and a labeling module 222 allowing a user to customize clusters for messages (by removing system created categories and/or creating additional categories.) Furthermore, the customization module 118 optionally includes one or more additional customization modules 224 for providing further user customization of categorization rules.

In some implementations, the user interface 205 includes an input device (e.g., a keyboard, a mouse, a touchpad, a track pad, and a touch screen) for a user to interact with the device 102.

In some implementations, the labeling module 222 labels an electronic message using a flag in accordance with which category the electronic message has been assigned. For example, after an email is assigned to both a "Travel" category and a "Promotion" category, the labeling module 222 assigns both the label "Travel" and the label "Promotion" to the electronic message. These approaches are advantageous, because message labels may simplify searches and selective retrievals of electronic messages, e.g., electronic messages may be searched, and retrieved, both using labels.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above. In some embodiments, the device 102 is a thin client which does not include one or more of the customization modules 118 (e.g., the starring module 216; organization module 218; filtering module 220; labeling module 222, etc), and as such categorization customization is performed in part or in whole on the server categorization system 106.

Figure 3A:
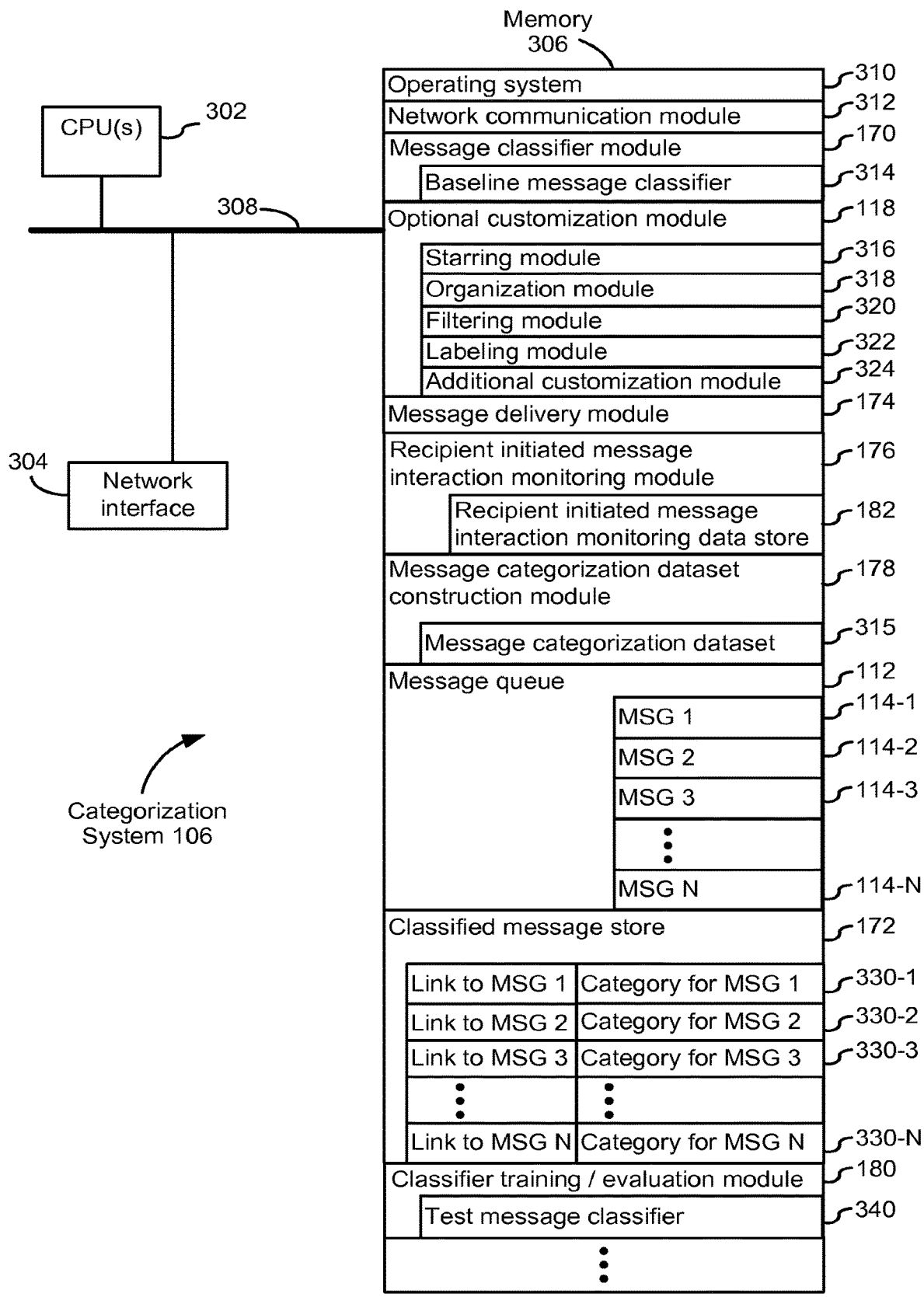
FIG. 3A is an example block diagram illustrating a computing system, in accordance with some implementations.

FIG. 3A is a block diagram illustrating a categorization system 106, in accordance with a more detailed implementation. The categorization system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the categorization system 106 with other devices (e.g., the devices 102) via the one or more network interfaces 304 (wired or wireless), or the communication network 104 (FIG. 1);
- a message classifier module 170 for conducting an analysis of a first plurality of electronic messages thereby independently identifying an initial message category in a set of message categories for each respective message in the first plurality of messages using a baseline message classifier 314;
- an optional customization module 118 for allowing a user to create and/or edit categorization rules in accordance with various categorization actions;
- a message delivery module 174 for delivering messages that have been classified by message classifier module 170 to one or more recipients;
- a recipient initiated message interaction monitoring module 176 for collecting a plurality of recipient initiated message interaction events for messages in the first plurality of messages over a predetermined period of time from the plurality of recipients and optionally storing such events in a recipient initiated message interaction monitoring data store 182;
- a message categorization dataset construction module 178 for constructing a message categorization dataset (315) from (i) the first plurality of messages, (ii) the designation of the message category of each respective message in the plurality of messages assigned by the message classifier module 170, and (iii) the plurality of recipient initiated message interaction events collected by recipient initiated message interaction monitoring module 176;

a message queue 112 for storing electronic messages e.g., MSG 1, MSG 2, MSG 3, . . . MSG N (114-1, . . . , 114-N) awaiting processing by the message classifier module 170;

a classified message store 172, which includes a message category 330 in the set of message categories for each respective message analyzed by the message classifier module 170 as well as either the respective message or a link to the respective message;

a classifier training/evaluation module 180 that uses the message categorization dataset 315 to train or measure the performance of a test message classifier 340.

In some embodiments, the customization module 118 includes one or more of the following: a starring module 316 to allow a user to star a message for inclusion in a priority category; an organization module 318 to allow a user to move a message from one category to another (e.g., by dragging dropping), a filtering module 320 for allowing a user to specify a category rule for a message, and a labeling module 322 allowing a user to customize categories for message (by removing system created categories and/or creating additional categories.) Furthermore, the customization module 118 optionally includes one or more additional customization modules 324 for providing further user customization.

FIG. 3B illustrates an exemplary recipient initiated message interaction monitoring data store 182 in accordance with some embodiments. Recipient initiated message interaction monitoring module 176 receives events from the message interaction event monitoring/communication modules 214 of respective devices 102 in computing system 100 and stores them in recipient initiated message interaction monitoring data store 182 in the form of data pairs, each data pair 194 comprising a message 114, or link to the message, and a corresponding recipient initiated message interaction type 192. In some embodiments, a given message 114 is delivered to multiple recipients. Accordingly, in some embodiments, it is possible for data store 182 to include interactions 192 from more than recipient for a given message 114. In some embodiments, a given message 114 includes multiple interactions 192 from a single recipient for a given message 114. For example, in some embodiments, a single recipient opens a message 114, reviews the message, replies to the message, and forwards the message. Each of these events constitutes a recipient initiated message interaction and accordingly, for some embodiments, such events are stored for a given message 114. It follows that, in some embodiments, a given message 114 includes multiple interactions 192 from each of a plurality of recipients for the given message 114.

FIG. 3C illustrates an exemplary message categorization dataset 315 in accordance with some embodiments. In some embodiments, message categorization dataset 315 includes at least a subset of the messages in the original first plurality of messages (114-1, . . . , 114-N of message queue 112). In some embodiments, message categorization dataset 315 includes all the messages in the original first plurality of messages (114-1, . . . , 114-N of message queue 112). In the embodiment illustrated in FIG. 3C, for each such message 114 included in the message categorization dataset 315, there is a copy or link (e.g., pointer) to the message 114, a corresponding weight 196 for the message, and a message category 198 for the message. In some embodiments, the message category 198 for a message is the message category initially assigned by message classifier module 170. However, in some embodiments, this is not necessarily the case. For instance, in some embodiments, the message category 198 for a message 114 in message categorization dataset 315 is one that has been assigned by the recipient of the message and differs from the initial category originally assigned to the message by the message classifier module 170. In some embodiments, a weight 196 is assigned to one or more respective messages in the message categorization dataset that is determined as a function of the message interaction events associated with the respective messages in the data store 182 (FIG. 3B). For instance, if there are one or more events associated with a respective message 114 in data store 182 that indicates explicit or tacit approval of the message category originally assigned by the message classifier module 170, the weight 196 for the respective message is upweighted relative to those messages that lack such feedback or have incurred events that suggest recipient disagreement with the initial category. In some embodiments, the weight 196 assigned to a respective message is a function of not only the recipient interaction events associated with a respective message, but also the original classifier score for the respective message determined by the message classifier module 170 using the baseline message classifier 314. In such embodiments, recipient events that suggest recipient agreement with the initial category (e.g., labeling the message as important, replying to the message, forwarding the message, opening but not changing the category of the message), combined with a classifier score from message classifier module 170 that indicates high confidence in the initial message classification leads to an upweighted weight 196 for the respective message 114, whereas recipient events that suggest recipient disagreement with the initial category (e.g., category reassignment, deletion of message, etc.), combined with a classifier score from message classifier module 170 that suggest low or marginal confidence in the initial message classification leads to a downweighted weight 196 for the respective message 114.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and a "categorization system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
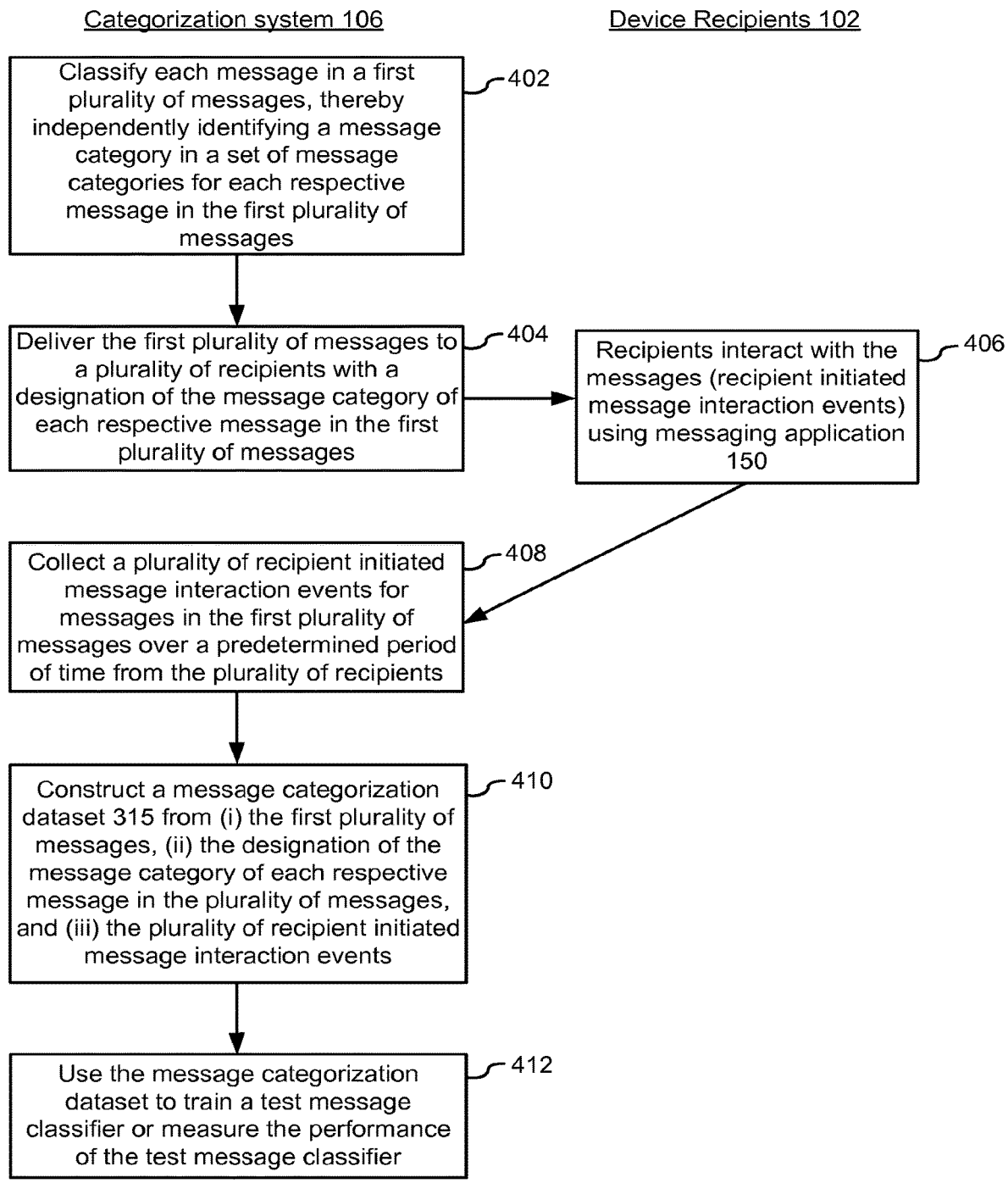
FIG. 4 is an example flow chart illustrating a method for categorizing messages, in accordance with some implementations.

FIG. 4 is a flow chart illustrating a method for classifying messages in a computing system in accordance with some implementations. In accordance with the disclosed systems and methods, messages in a first plurality of messages are classified, thereby independently identifying a message category in a set of message categories for each respective message in the first plurality of messages (402). In some embodiments, the plurality of messages includes messages from a plurality of senders. In some embodiments, the classifying is done by a baseline message classifier that was constructed at a time prior to the classifying 402.

In some embodiments, the messages in the first plurality of messages are classified into the set of message categories using any of a number of possible techniques. In one example, the message classifier module 170 uses the baseline message classifier 314 to examine the content of a message. If the message contains words or phrases that are usually associated with a particular category in the set of categories, the message classifier classifies the message in that particular category. In another example, the baseline message classifier 314 compares the contents of a message to be classified to previously classified emails. If the unclassified message is similar to one or more previously sent messages, the message classifier classifies the message in the same category as the previously sent messages.

Figure 5:
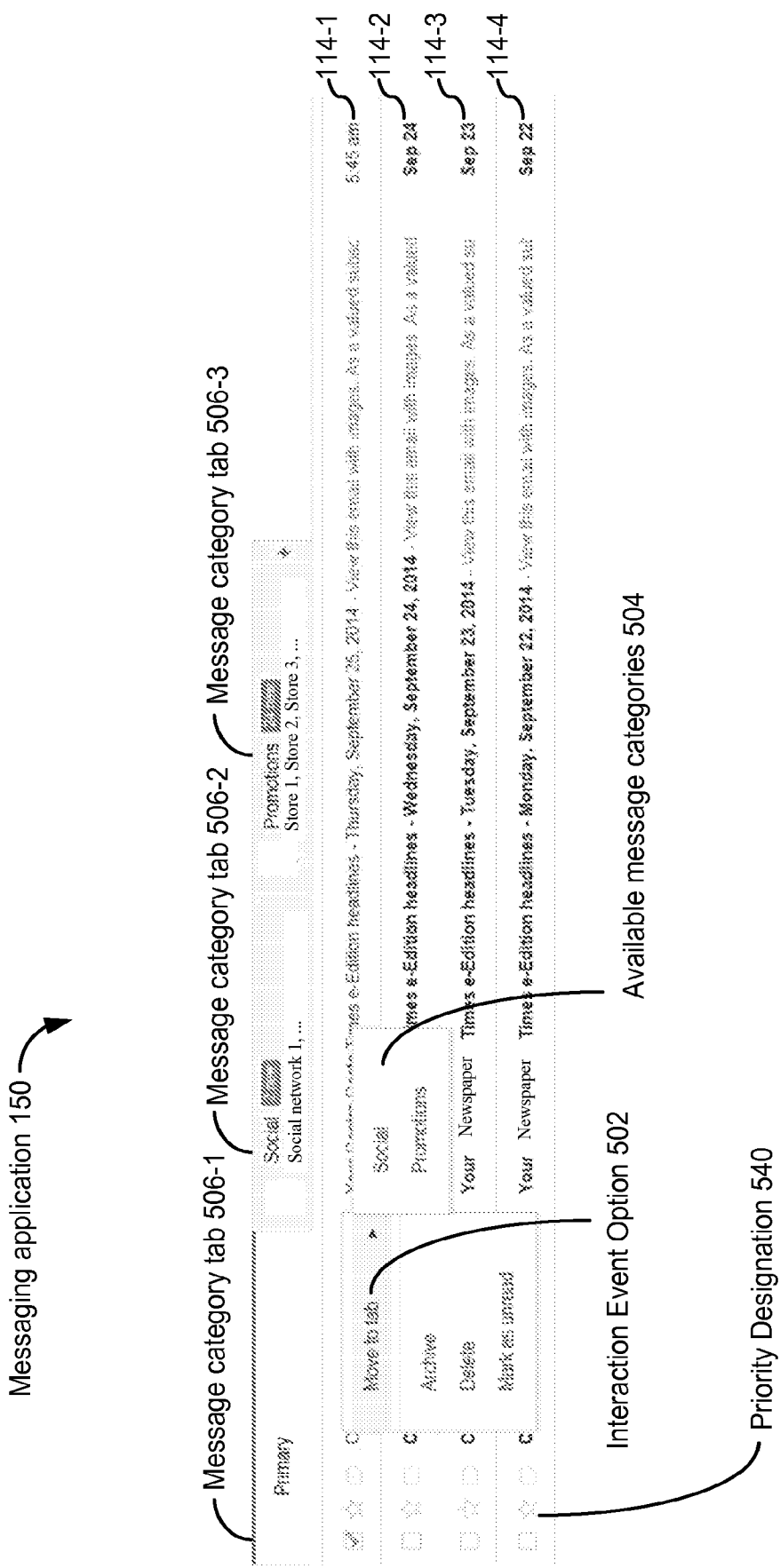
FIG. 5 is a user interface in a device based message application that enables message recipients to interact with received messages in accordance with some embodiments.
Figure 6A:
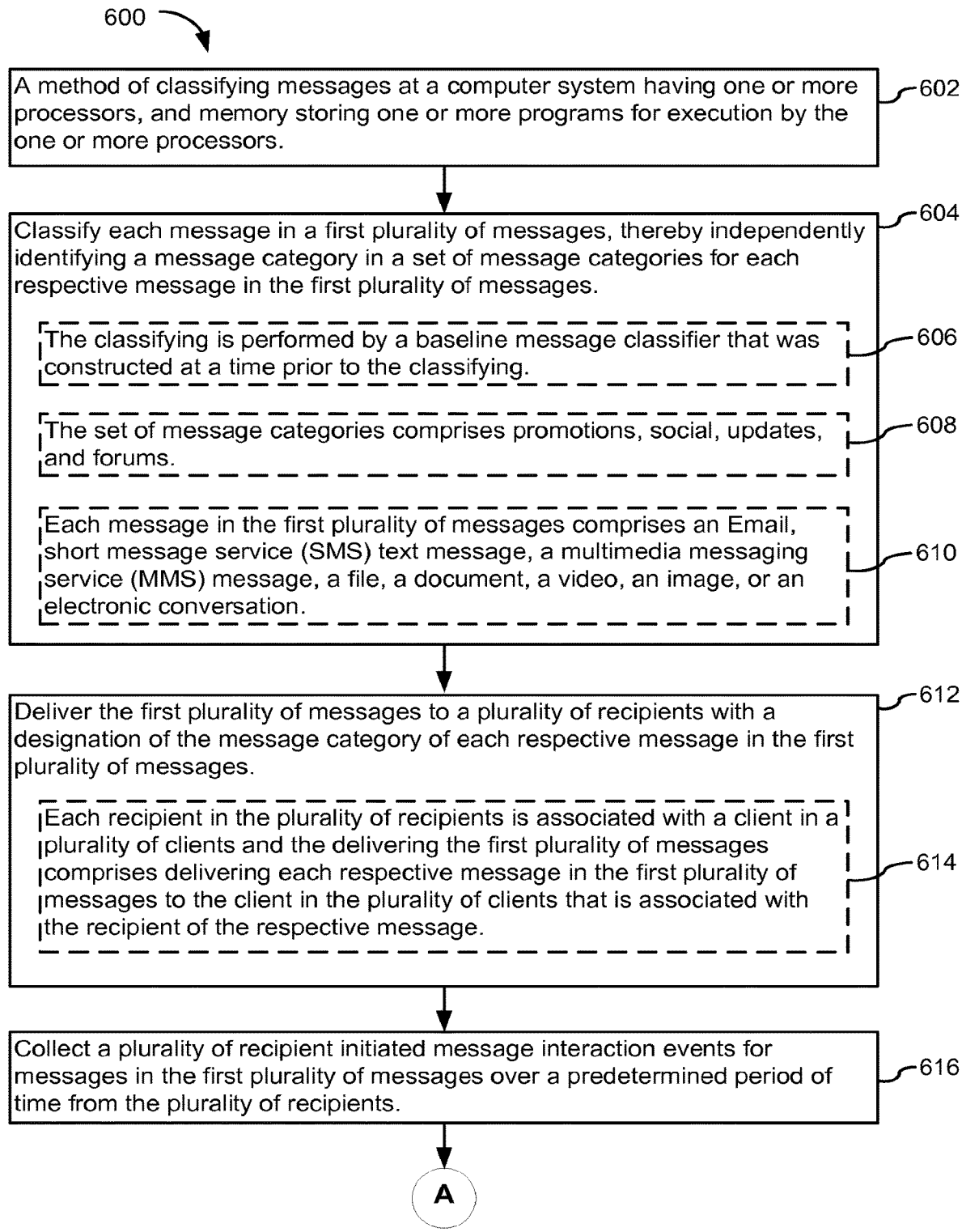
FIGS. 6A-6D provide a flow chart of methods of classifying messages in accordance with some implementations.
Figure 6B:
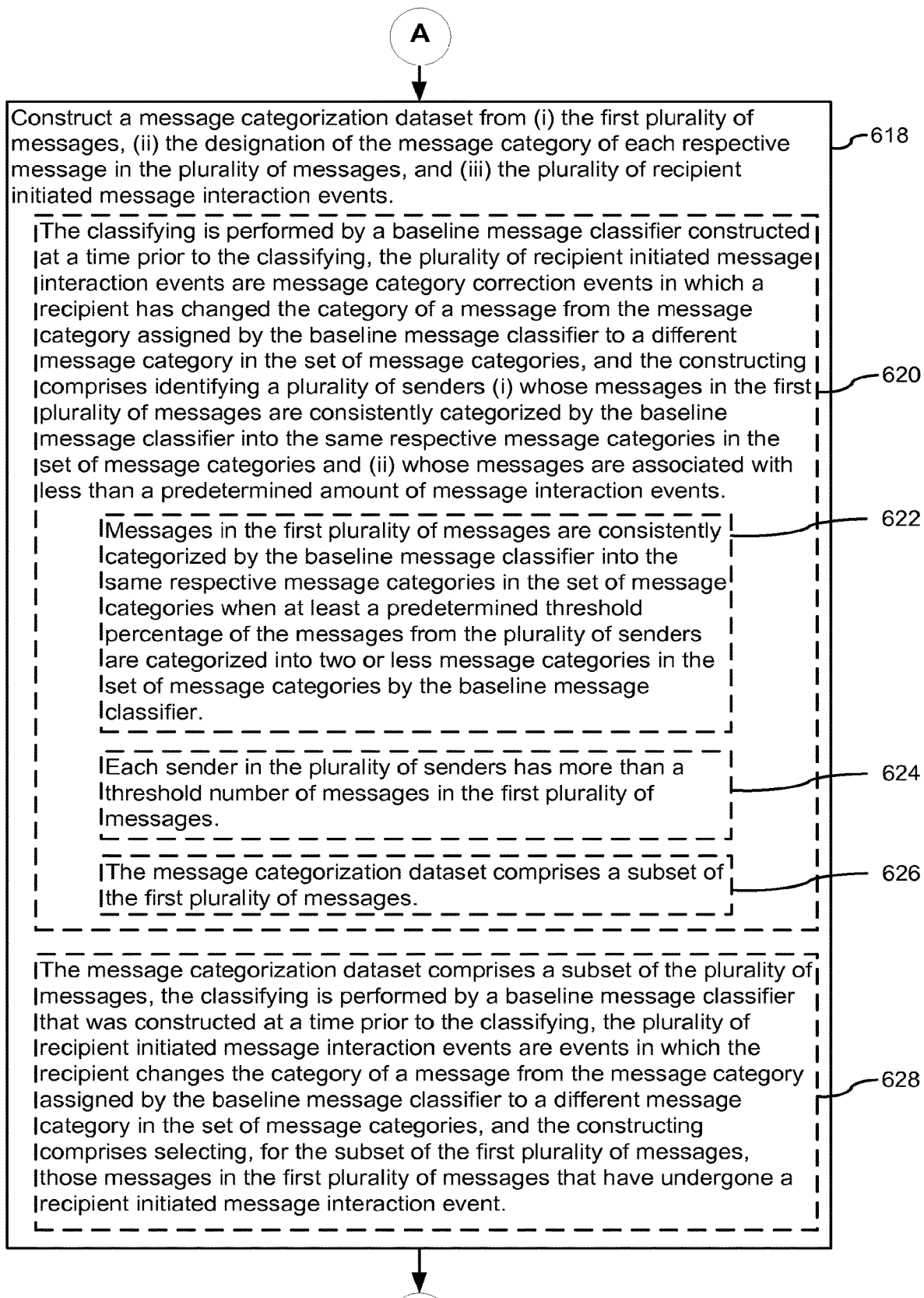
Figure 6C:
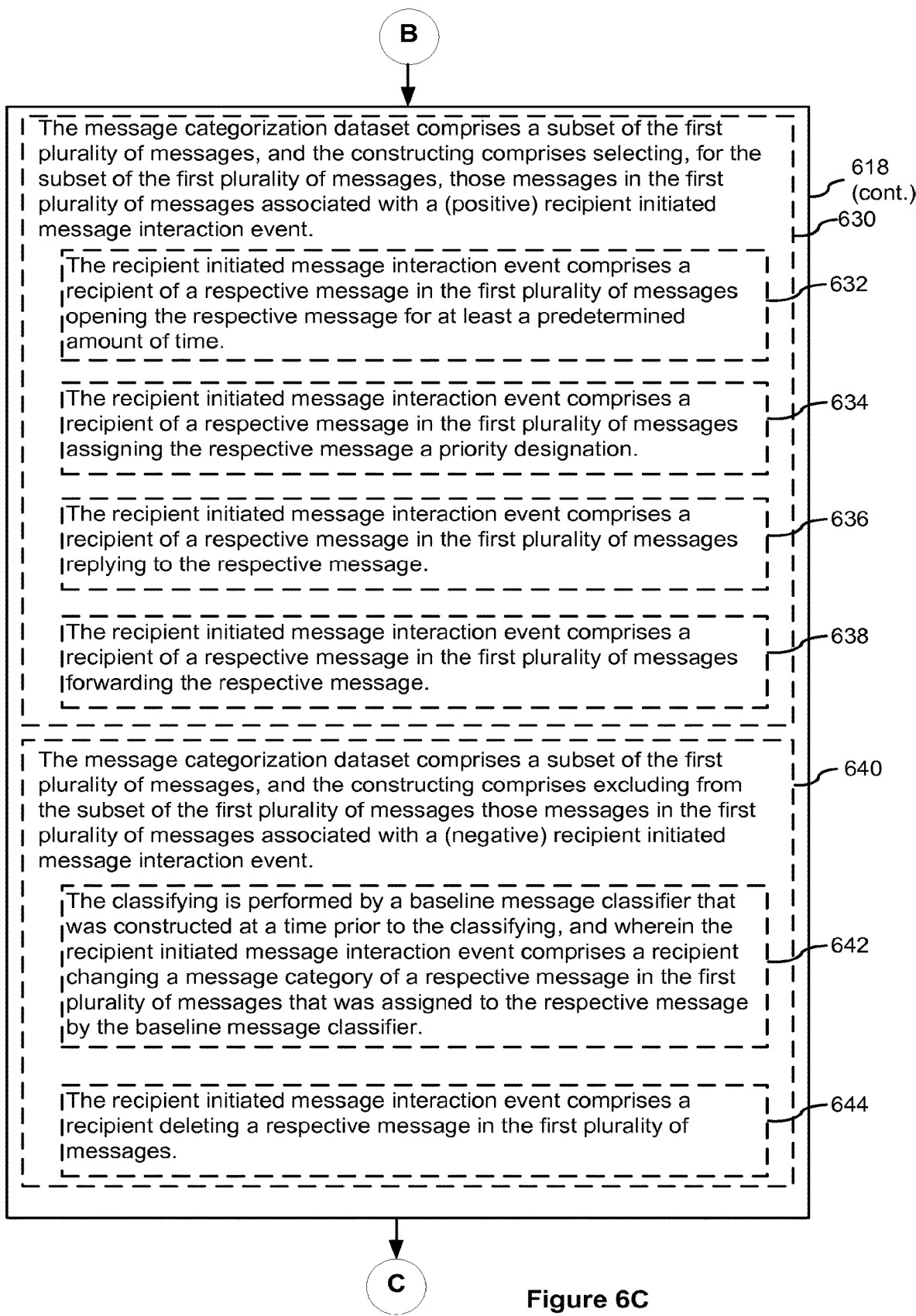
Figure 6D:
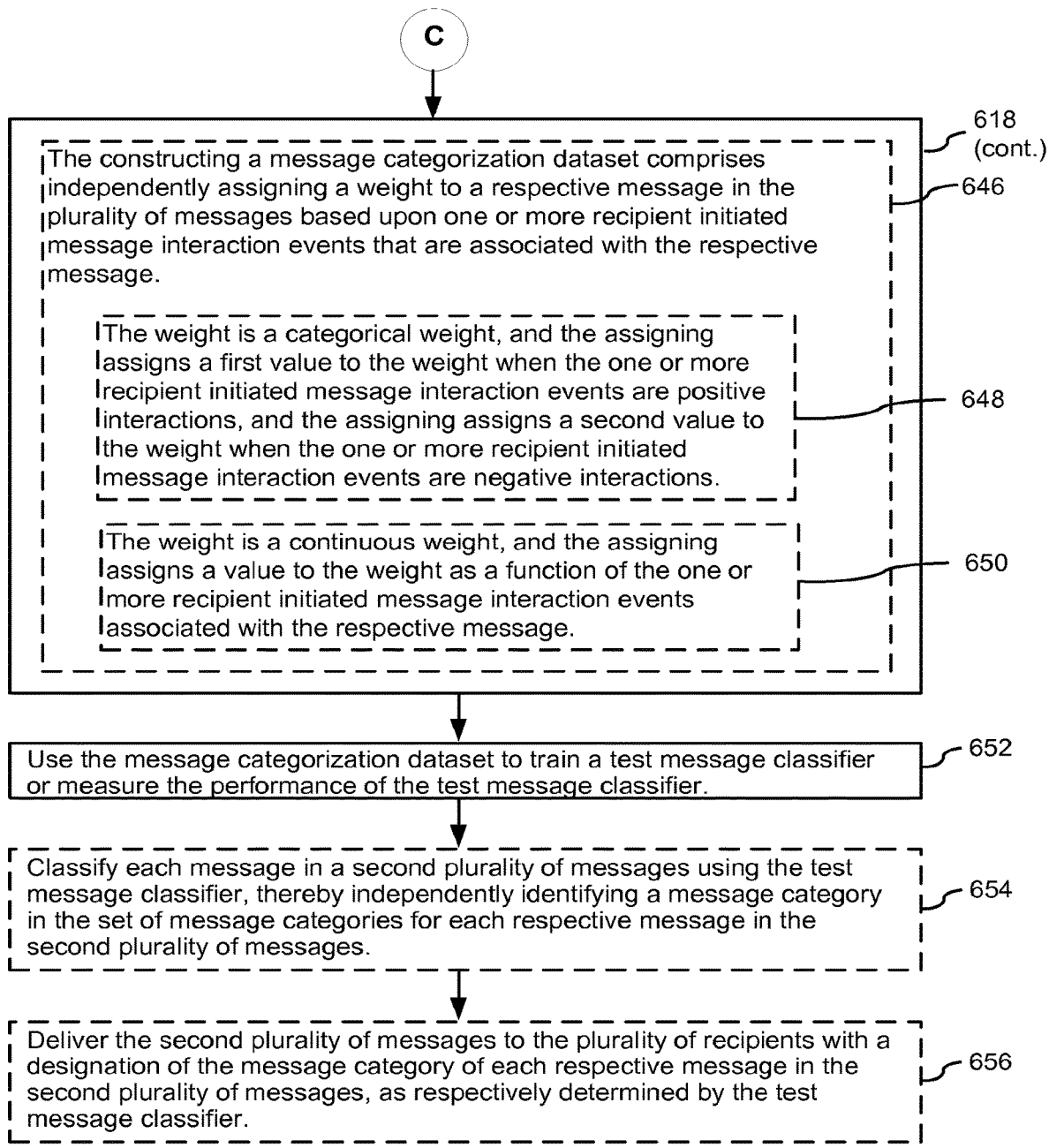

The categorized messages are delivered to recipients 102 (406). Recipients review the categorized messages and interact with them using messaging application 150 (406). Such interactions are termed recipient initiated message interaction events. In some embodiments a recipient initiated message interaction event is an event in which the recipient changes the message category of a received message 114. FIG. 5 illustrates. In FIG. 5, a portion of the interface of an exemplary messaging application 150 running on a user device 102 is depicted. The exemplary messaging application 150 receives the first plurality of messages and arranges the messages into the tabs 506 that correspond to message categories. For example, those messages in the first plurality of messages that have been classified as "primary" by the baseline message classifier 314 are placed in message category tab 506-1, those messages in the first plurality of messages that have been classified as "social" by the test message classifier are placed in message category tab 506-2, those messages in the first and plurality of messages that have been classified as "promotions" are placed in message category tab 506-3. In FIG. 5, tab 506-1 is featured, meaning that the messages 114 in the category represented by tab 506-1 (primary) are listed in a specified order. In the example illustrated in FIG. 5, this order is chronological, but other ordering is available.

FIG. 5 further illustrates how a recipient can initiate a message category correction event. The user selects a listed message (e.g., message 114-1), for example by right-clicking on the message with a mouse, thereby bringing up a menu that includes correction event option 502. By selecting correction event option 502, the user can change the category of the message to any of the other message category in a set of message categories using selection panel 504 (available message categories). In some embodiments, the set of message categories comprises promotions, social, updates, forums, travel, finance and receipts. In some embodiments, the set of message categories comprises primary, promotions, social, updates, forums, travel, finance and receipts, or any subcombination thereof. In some embodiments, the set of message categories is any combination primary, promotions, social, updates, and forums in addition to one or more user defined categories.

Returning to FIG. 4, in the disclosed methods, the interaction events that are tracked are not limited to recipient initiated changes to message categories of received messages. In some embodiments, recipient initiated events such as opening of messages 114, forwarding of messages 114, replying to messages 114, reviewing messages 114, deleting messages 114, labeling messages 114 as being important, are collected (e.g., over a predetermined period of time) from the recipients (408). In some embodiments, such collection is done on a recurring incremental basis, e.g., every hour, once a day, once a week. In some embodiments, such collection is done over a single predetermined period of time such as one hour, one day, one week, or one month. Data structure 182 illustrates one such data structure of the information that is collected in step 408. In some embodiments, data structure 182 includes additional fields, such as an identifier for the recipients (e.g., in cases where there are multiple recipients of a given message), a time when the event occurred, etc. In particular, in some embodiments that track when events occurred, more recent events can be given more significance when assigning a weight to a given message or when deciding whether or not to include the message in the message categorization dataset 315.

In step 410, a message categorization dataset 315 is constructed from (i) the first plurality of messages, (ii) the designation of the message category of each respective message in the subset of messages, and (iii) the plurality of recipient initiated message interaction events that were collected. As noted above with respect to step 408, in some embodiments events are collected on a rolling basis and, in such embodiments, the messages categorization dataset is constructed on a rolling basis.

In some embodiments step 410 involves identifying messages for message categorization dataset 315 that are not associated with recipient corrective events such as manual recipient message recategorization. In particular embodiments, what is sought is a list of senders that are consistently categorized into the same set of categories by the baseline message classifier in step 402, have a lot of deliveries (e.g., are well represented by messages in the first plurality of messages) and very few corrective events. For such messages the initial designation by the baseline classifier in step 402 can be more trusted. As such, in some such embodiments, what is sought is the identification of a plurality of senders whose messages in the first plurality of messages are consistently categorized by the baseline message classifier into the same respective message categories in the set of message categories and (ii) whose messages are associated with less than a predetermined amount of message interaction events. Precisely what constitutes being "consistently categorized" and "less than a predetermined amount" in such embodiments is application dependent.

By way of example, in some embodiments, messages are deemed to be "consistently categorized" by the baseline message classifier into the same respective message categories in the set of message categories in step 402 when at least a predetermined threshold percentage of the messages (e.g., at least seventy percent, at least eighty percent, at least ninety percent, at least 98 percent, at least 99 percent) from the plurality of senders are categorized into two or less message categories in the set of message categories by the baseline message classifier.

By way of another example, in some embodiments, messages are deemed to be "consistently categorized" by the baseline message classifier into the same respective message categories in the set of message categories in step 402 when at least a predetermined threshold percentage of the messages (e.g., at least seventy percent, at least eighty percent, at least ninety percent, at least 98 percent, at least 99 percent) from the plurality of senders are categorized into a single message category in the set of message categories by the baseline message classifier. In other words, the messages for each respective sender in the plurality of senders are classified into a single message category. In some such embodiments, there is no requirement that each sender's messages be categorized into the same message category such that all messages from the plurality of senders are categorized into the same category. Rather, for example, all the messages from a first sender in the plurality of senders can be categorized to a first message category and all the messages from a second sender in the plurality of senders can be categorized to a second message category.

In such embodiments, the term "less than a predetermined amount" of message interaction events is application dependent. In some embodiments, if any messages from a sender incur a manual recipient message category correction event, the sender and all the messages from the sender are disqualified from inclusion in the message categorization dataset 315. In some embodiments, the messages from a respective sender qualify for inclusion in the message categorization dataset 315 when less than a threshold percentage of the messages from the sender incur a manual recipient message category correction event (provided the above identified "consistently categorizing" requirement is met). In some embodiments, such a threshold is not applied and, rather, a weight is assigned to a respective message in the message categorization dataset 315 as a function of the consistency by which the respective message sender's messages are historically categorized into particular message categories (e.g., the same message category, a select few message categories, etc.) and the frequency that messages from the sender of the respective message historically undergo recipient recategorization events (e.g., less than five percent of the time, less than 15 percent of the time). In some embodiments, such a threshold is not applied and, rather, a weight is assigned to a respective message as a function of some combination of (i) a score representative of the original confidence in the first classifier score for the respective message (from step 402), (ii) the consistency by which messages from the sender of the respective message are categorized into particular message categories (e.g., the same message category, a select few message categories, etc.), and (iii) the frequency that messages from the sender of the respective message historically undergo recipient recategorization events (e.g., less than five percent of the time, less than 15 percent of the time).

In some embodiments, in order for a sender to qualify for evaluation as to whether the sender is one whose messages are consistently categorized by the baseline message classifier into the same respective message categories in the set of message categories and (ii) whose messages are associated with less than a predetermined amount of message interaction events, the sender must have more than a threshold number of messages in the first plurality of messages. This threshold number is application dependent and, for instance, will depend in some embodiments on the total number of messages there are in the first plurality of messages. In some embodiments, the threshold number is a number that is sufficient to have confidences that observations, such as message categorization (in step 402) and manual message recategorization (in step 406) have statistical significance. In some such embodiments, this is achieved when the number of messages from a given sender exceeds ten messages. In some such embodiments, this is achieved when the number of messages from a given sender exceeds one hundred messages.

In some alternative embodiments, the message categorization dataset 315 is constructed by identifying recipient initiated message interaction events in which the recipient changes the category of a message from the message category assigned by the baseline message classifier to a different message category in the set of message categories. In such embodiments, it is assumed that recipient selected message categories is closer to the ground truth for such messages than message categories assigned by an automated classifier in step 402. An example of a message that would be included in the message categorization dataset 315 in such embodiments is a message that was initially classified into the category "updates" in step 402 by the baseline message classifier but was reclassified into the category "social" by the recipient of the message using messaging application 150 at an associated user device 102. Here, the new message category for the message, "social," is considered validated because the message recipient upon reviewing the message took the time and effort to reclassify the message. Embodiments of the present disclosure capitalize on such information to construct the message categorization dataset 315. In some embodiments, such manual recipient reclassification serves as just one factor in determining which messages to include in the message categorization dataset. For instance, in some embodiments messages in the message categorization dataset 315 are culled from the first plurality of messages, with each such message in the dataset 315 being given a weight that is a function of the combination of a confidence score assigned by the baseline classifier in step 402 and a score given to messages when they undergo a manual recipient recategorization event. As another example, in some embodiments messages in the message categorization dataset 315 are culled from the first plurality of messages, with each such message in the dataset 315 being given a weight that is a function of a first score given to messages when they undergo a manual recipient recategorization event and a second score given to messages when they undergo positive recipient initiated message interaction events such as being reviewed for at least a predetermined amount of time, being forwarded, being replied to, or being labeled as special or important or a priority message. Thus, in such embodiments, a message categorization dataset is built using the identity of messages whose categories have been reassigned by recipients, together with the message categories identified for such recipients. In some embodiments, rather than providing a weight for each message in the message categorization dataset, the selection of messages from the first plurality of messages for inclusion in the message categorization dataset 315 is strictly categorical, with those messages in the first plurality of messages that have been manually reassigned by recipients being included in the dataset 315 and those messages in the first plurality of messages that have not been reassigned not being included in the dataset 315. In still other embodiments, messages in the first plurality of messages that received a score from the baseline classifier in step 402 that indicates a high degree of confidence in the initial classification of such messages and messages that have been manually recategorized by message recipients, regardless of the classifier scores assigned to such messages in step 402, are included in the message categorization dataset 315. For example, in some embodiments, a first message is included in the dataset 315 because the baseline classifier assigned the first message to a first message category with a high degree of confidence and a second message is included in the dataset 315 even thought the baseline classifier in step 402 did not assign the second message a message category with a high degree of confidence because the message recipient for the second message recategorized the message.

In still other embodiments, the message categorization dataset is constructed from a subset of the first plurality of messages that are associated with a positive recipient initiated message interaction events. In some embodiments, a positive recipient initiated message interaction event is one in which a recipient of a respective message in the first plurality of messages opens the respective message. In some embodiments, a positive recipient initiated message interaction event is one in which a recipient of a respective message in the first plurality of messages opens the respective message for a predetermined amount of time. Here, the predetermined amount of time is an amount of time that is sufficient to have confidence that the user had an interest in the message, and thus tacitly accepted the message categorization of the message. Thus, the amount of time, in some embodiments, is one second or more, 10 seconds or more. In some embodiments, rather than a predetermined amount of time, what is sought is an opening event combined with one or more scrolling events to ensure that the recipient reviewed the message and therefore tacitly agreed with the message category. Accordingly, in some embodiments the respective message 114 associated with the message opening event, and the category assigned to the respective message by the baseline message classifier of step 402, is included in the message categorization dataset 315. In other embodiments the respective message 114 associated with the message opening event, and the category assigned to the respective message by the baseline message classifier of step 402, is included in the message categorization dataset 315 with a weight whose value has been determined, at least in part, by the occurrence of the message opening event associated with the respective message.

In some embodiments, a positive recipient initiated message interaction event is one in which a recipient of a respective message in the first plurality of messages assigns the respective message a priority designation. For example, in the exemplary messaging application 150 of FIG. 5, a user assigns a priority designation by using the star button next to a respective message 114 to indicate that the respective message is a priority message. Such a recipient initiated message interaction event (starring the message) is deemed to be, in such embodiments, tacit agreement by the recipient that the baseline message classifier of step 402 correctly categorized the message. Accordingly, in some embodiments the respective message 114, and the category assigned to the respective message by the baseline message classifier of step 402, is included in the message categorization dataset 315. In other embodiments the respective message 114, and the category assigned to the respective message by the baseline message classifier of step 402, is included in the message categorization dataset 315 with a weight whose value has been determined, at least in part, by the occurrence of the priority designation event associated with the respective message.

In some embodiments, a positive recipient initiated message interaction event is one in which a recipient of a respective message in the first plurality of messages replies to or forwards the respective message. Such a recipient initiated message interaction event is deemed to be, in such embodiments, tacit agreement by the recipient that the baseline message classifier of step 402 correctly categorized the respective message. Accordingly, in some embodiments the respective message 114, and the category assigned to the respective message by the baseline message classifier of step 402, is included in the message categorization dataset 315. In other embodiments the respective message 114, and the category assigned to the respective message by the baseline message classifier of step 402, is included in the message categorization dataset 315 with a weight whose value has been determined, at least in part, by the occurrence of the message reply or forward event associated with the respective message.

The above identified embodiments of step 410 have identified certain positive confirmatory events that help to validate the initial message category assignments made to messages in the first plurality of messages in step 402. In some embodiments, in addition to, or instead of such positive events, negative events are tracked in step 406, collected in step 408 and used in step 410 to help define and construct the message categorization dataset 315. For example, in some such embodiments, the message categorization dataset comprises a subset of the plurality of messages, and the constructing comprises excluding from the subset of the first plurality of messages those messages in the first plurality of messages associated with a negative recipient initiated message interaction event. Examples of such negative recipient initiated message interaction event include, but are not limited to (i) a recipient changing a message category of a respective message in the first plurality of messages that was assigned to the respective message by the baseline message classifier and (ii) a recipient deleting a received message without opening the message. In some embodiments, message association with a negative recipient initiated message interaction event is used to categorically exclude a respective message in the first plurality of messages from inclusion in the message categorization dataset. In some alternative embodiments, rather than altogether excluding a respective message in the first plurality of messages from the message categorization dataset 315, message association with a negative recipient initiated message interaction event is used to downweight the respective message in the first plurality of messages in the message categorization dataset.

In step 412, the message categorization dataset 315 is used to train a test message classifier or measure the performance of the test message classifier. In some embodiments, the test message classifier and the baseline message classifier are the same message classifier.

Examples of classifiers that are used as the test and/or baseline message classifier are described in, for example, Duda, 2001, Pattern Classification, John Wiley & Sons, Inc., and Hastie et al., 2001, The Elements of Statistical Learning, Springer-Verlag, New York, each of which are hereby incorporated by reference. For instance, examples of classifiers that are used in some embodiments for the test message classifier and/or the baseline message classifier include, but are not limited to, decision trees, multiple additive regression trees, neural networks, clustering, principal component analysis, nearest neighbor analysis, linear discriminant analysis, quadratic discriminant analysis, support vector machines, variants and derivatives thereof, all either alone or in any combination. Moreover, in some embodiments, the test message classifier and/or the baseline message classifier comprises a plurality of classifiers that have been combined using techniques such as bagging, boosting, a random subspace method, additive trees, Adaboost or other known combining techniques. See, for example, Breiman, 1996, Machine Learning 24, 123-140, and Efron and Tibshirani, "An Introduction to Boostrap," Chapman & Hall, New York, 1993, which is hereby incorporated by reference in its entirety.

As noted at the outset, in typical embodiments, message categories in the set of message categories are problematic for a number of reasons, including the fact that the class distribution among the set of message classes is typically not balanced. That is, a great number of messages fall into one category in the set of categories compared to other categories in the set of categories. As such class distribution becomes more skewed, evaluation of classifier performance based on accuracy because less satisfactory. Furthermore, evaluation of a classifier by accuracy also assumes equal error cost, that is the false positive error (e.g. recipient centric perceptual cost of a false positive) with respect to a given message category is equivalent to the false negative error (e.g. recipient centric perceptual cost of a false negative) for the respective message category. However, such an assumption often does not map to real world message categorization. that is, for some message categories, the error cost for false inclusion in the message category is not the same as the error cost for false exclusion from the message category. Nevertheless, in some embodiments of the present disclosure, the message categories provided in the message categorization dataset 315 are deemed to be the closest thing to ground truth that will be realized and a test classifier's accuracy in correctly guessing the message category of each message in the message categorization dataset 315 (against the message categories of such messages as set forth in the dataset) is used to measure the performance of the test classifier. If the test message classifier is highly accurate, the test message classifier may be employed in the field to classify messages for delivery to recipients.

In other embodiments, the message categorization dataset 315 is used to measure the performance of a test classifier using techniques other than those that are strictly based upon an accuracy metrics that are known in the art. To consider classifier evaluation, let $\{p,n\}$ be the positive and negative instance classes, and let $\{Y, N\}$ be the classifications produced by the test classifier for a given message class. Let $p(p|I)$ be the posterior probability that message I is positive for the given message class. In some embodiments, the true positive rate, TP, of the classifier for this message class is:

$$TP = p(Y|p) \approx \frac{\text{positives correctly identified}}{\text{total positives}}$$

In some embodiments, the false positive rate, FP, for the test classifier for the given classifier is:

$$FP = p(Y|n) \approx \frac{\text{negatives incorrectly identified}}{\text{total positives}}$$

In some embodiments, if c(classification,class) is a two-place error cost function where c(Y, n) is the cost of a false positive error and c(N, p) is the cost of a false negative error, I the decision to emit a positive classification is:

[1−p(p|I)·c(Y,n)]≤p(p|I)·c(N,p)

Regardless of whether the test classifier produces probabilistic or binary classifications for a given message category, its normalized cost on the message categorization dataset 315 can therefore be evaluated empirically as:

Cost=FP·c(Y,n)+FN·c(N,p)

Thus, in some embodiments, the test classifier is evaluated using the message categorization dataset 315 by determining the cost using the above-identified equation or some other type of cost functions. Such a technique for evaluating classifiers is provided by way of illustration only and in fact, any method for using the message categorization dataset 315 to evaluate the performance of the test message classifier is within the scope of the present disclosure. One such method is a receiver operator curve convex hull method disclosed in Provost and Fawcett, 1997, "Analysis and Visualization of Classifier Performance: Comparison under Imprecise Class and Cost Distributions," KDD-97 Proceedings pp 43-48, which is hereby incorporated by reference, as a nonlimiting example of alternatives to classifier accuracy measurements.

In some embodiments, rather than evaluating the performance of the test message classifier, the message categorization dataset 315 is used to train the message classifier. Ways in which the message categorization dataset 315 is used to train the test message classifier depend upon the nature of the classifier (e.g., whether the classifier is a neural network, support vector machine, decision tree, etc.). Examples of training classifiers are given, for example, in Duda et al., 2001, *Pattern Classification*, Second Edition, John Wiley & Sons, Inc., New York which is hereby incorporated by reference for the purpose of illustrating nonlimiting examples of ways to train classifiers using a dataset such as the message categorization dataset 315.

In this description, reference has been made to a test message classifier. It will be appreciated that the systems and methods of the present disclosure can be use to either train or measure the performance of any number of classifiers. Reference is given to the "test classifier" to identify any one such classifier.

FIG. 6 illustrates a flow chart for methods 600 of classifying messages at a computer system having one or more processors, and memory storing one or more programs for execution by the one or more processors (602). Each message in a first plurality of messages is classified, thereby independently identifying a message category in a set of message categories for each respective message in the first plurality of messages (604). In some embodiments, the classifying (604) is performed by a baseline message classifier that was constructed (e.g., trained) at a time prior to the classifying (606). In some embodiments, the baseline message classifier is trained at a time prior to the classifying (604) using data other than the first plurality of messages (606). In some embodiments, the set of message categories comprises promotions, social, updates, forums, travel, finance and receipts (608). In some embodiments, each message in the first plurality of messages comprises an Email, short message service (SMS) text message, a multi-media messaging service (MMS) message, a file, a document, a video, an image, or an electronic conversation (610).

The method continues with the delivery of the first plurality of messages to a plurality of recipients with a designation of the message category of each respective message in the first plurality of messages (612). In some embodiments, as illustrated in FIG. 1, each recipient in the plurality of recipients is associated with a client 102 in a plurality of clients and the delivering comprises delivering each respective message in the first plurality of messages to the respective client 102 in the plurality of clients that is associated with the recipient(s) of the respective message (614).

In some embodiments, a plurality of recipient initiated message interaction events is collected for messages in the first plurality of messages over a predetermined period of time from the plurality of recipients (616). Then, a message categorization dataset 315 is constructed from (i) the first plurality of messages, (ii) the designation of the message category of each respective message in the plurality of messages, and (iii) the plurality of recipient initiated message interaction events (618).

In some embodiments in accordance with step (618), the classifying of step 604 is performed by a baseline message classifier constructed at a time prior to the classifying, the plurality of recipient initiated message interaction events collected in step 616 are message category correction events in which a recipient has changed the category of a message from the message category assigned by the baseline message classifier to a different message category in the set of message categories, and the constructing 618 comprises identifying a plurality of senders (i) whose messages in the first plurality of messages are consistently categorized by the baseline message classifier into the same respective message categories in the set of message categories and (ii) whose messages are associated with less than a predetermined amount of message interaction events (620). In some such embodiments, messages in the first plurality of messages are consistently categorized by the baseline message classifier into the same respective message categories in the set of message categories when at least a predetermined threshold percentage of the messages from the plurality of senders are categorized into two or less message categories in the set of message categories by the baseline message classifier (622). In some such embodiments, each sender in the plurality of senders has more than a threshold number of messages in the first plurality of messages (624). In some such embodiments, the message categorization dataset 315 comprises a subset of the first plurality of messages (626).

In other embodiments, the message categorization dataset 315 comprises a subset of the first plurality of messages, the classifying 604 is performed by a baseline message classifier that was constructed at a time prior to the classifying, the plurality of recipient initiated message interaction events are events in which the recipient changes the category of a message from the message category assigned by the baseline message classifier to a different message category in the set of message categories, and the constructing 618 comprises selecting, for the subset of the first plurality of messages, those messages in the first plurality of messages that have undergone a recipient initiated message interaction event (628).

In still other embodiments, the message categorization dataset 315 comprises a subset of the first plurality of messages, and the constructing (618) comprises selecting, for the subset of the first plurality of messages, those messages in the first plurality of messages associated with a (positive) recipient initiated message interaction event (630), such as opening the respective message for at least a predetermined amount of time (632), assigning the respective message a priority designation (634), replying to the respective message (636), or forwarding the respective message (638).

In some embodiments, the message categorization dataset 315 comprises a subset of the first plurality of messages, and the constructing (618) comprises excluding from the subset of the first plurality of messages those messages in the first plurality of messages associated with a (negative) recipient initiated message interaction event (640), such as a recipient changing a message category of a respective message in the first plurality of messages that was assigned to the respective message by the baseline message classifier (642) or deleting a respective message in the first plurality of messages (644).

In some embodiments, the constructing a message categorization dataset (618) comprises independently assigning a weight to a respective message in the plurality of messages based upon one or more recipient initiated message interaction events that are associated with the respective message (646). In some embodiments, such a weight is a categorical weight, and the assigning assigns a first value to the weight when the one or more recipient initiated message interaction events are positive interactions, and the assigning assigns a second value to the weight when the one or more recipient initiated message interaction events are negative interactions (648). In other embodiments, the weight is a continuous weight, and the assigning assigns a value to the weight as a function of the one or more recipient initiated message interaction events associated with the respective message (650).

The method continues with the message categorization dataset 315 being used to train a test message classifier or measure the performance of the test message classifier (652). Optionally, in some embodiments, each message in a second plurality of messages is classified using the test message classifier, thereby independently identifying a message category in the set of message categories for each respective message in the second plurality of messages (654). Optionally, in some embodiments, the second plurality of messages is delivered to the plurality of recipients with a designation of the message category of each respective message in the second plurality of messages, as respectively determined by the test message classifier (656).

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not necessarily the same object unless otherwise indicated herein.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.'

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-based method of classifying messages, the method comprising:
   collecting, by one or more processors, a plurality of recipient initiated message interaction events for messages in a first plurality of messages from a plurality of recipients, including a plurality of priority designation assignments and a plurality of message category change events in which a recipient has changed a category of a given message in the first plurality of messages from an original message category to an updated message category;
   identifying, by the one or more processors, a subset of the first plurality of messages as having trusted message category assignments based on the plurality of recipient initiated message interaction events;
   constructing, by the one or more processors, a message categorization dataset from the identified subset of the first plurality of messages, the constructing including selecting messages in the first plurality of messages that have undergone a recipient initiated message interaction event, wherein the message categorization dataset comprises, for each selected message from the identified subset, information identifying the message and information corresponding to a currently assigned message category for the message;
   training, by the one or more processors, a message classifier using the message categorization dataset;
   after training the message classifier, classifying each message in a second plurality of messages using the message classifier by the one or more processors; and
   delivering the second plurality of messages to one or more recipients with a designation of a respective message category of each message in the second plurality of messages, as determined by the message classifier.

2. The computer-based method of claim 1, wherein the message categorization dataset further comprises, for each selected message from the identified subset, information corresponding to a level of confidence in the original message category for the selected message.

3. The computer-based method of claim 2, wherein the information corresponding to the level of confidence in the original message category for each selected message comprises a weight assigned to the respective selected message.

4. The computer-based method of claim 1, wherein the constructing the message categorization dataset further includes assigning a weight to each respective message in the plurality of messages based upon one or more recipient initiated message interaction events that are associated with the respective message.

5. The computer-based method of claim 4, wherein:
   the assigning assigns a first value to the weight for a respective message when the one or more recipient initiated message interaction events for the respective message are positive interactions with respect to the original message category of the respective message; and
   the assigning assigns a second value to the weight for the respective message when the one or more recipient initiated message interaction events for the respective message are negative interactions with respect to the original message category of the respective message.

6. The computer-based method of claim 5, wherein the positive interactions indicate explicit or tacit approval of the original message category.

7. The computer-based method of claim 5, wherein the negative interactions indicate disagreement with the original message category.

8. The computer-based method of claim 7, wherein the negative interactions include either a category reassignment or deletion of a message.

9. The computer-based method of claim 4, wherein the weight is a weight on a continuous scale, and wherein the assigning assigns a value to the weight as a function of the one or more recipient initiated message interaction events associated with the respective message.

10. The computer-based method of claim 4, wherein assigning the weight is further based on an original classifier score for each respective message determined using a baseline message classifier different from the trained message classifier.

11. The computer-based method of claim 1, further comprising, prior to the collecting, identifying a plurality of senders whose messages satisfy a predetermined number of message category change events.

12. The computer-based method of claim 1, further comprising, prior to the collecting, identifying a plurality of senders whose have a threshold number of messages in the first plurality of messages.

13. The computer-based method of claim 1, wherein the selecting the messages in the first plurality of messages includes selecting a given message where a recipient of the given message replied to the given message, or selecting a given message where the recipient of the given message forwarded the respective message.

14. The computer-based method of claim 1, wherein each message in the first plurality of messages comprises a calendar entry, an email, short message service (SMS) text message, a multimedia messaging service (MMS) message, a file, a document, a video, an image, or an electronic conversation.

15. A computing system, comprising:
one or more processors;
memory storing one or more programs to be executed by the one or more processors, wherein the one or more programs comprise instructions for:
- collecting a plurality of recipient initiated message interaction events for messages in a first plurality of messages from a plurality of recipients, including a plurality of priority designation assignments and a plurality of message category change events in which a recipient has changed a category of a given message in the first plurality of messages from an original message category to an updated message category;
- identifying a subset of the first plurality of messages as having trusted message category assignments based on the plurality of recipient initiated message interaction events;
- constructing a message categorization dataset from the identified subset of the first plurality of messages, the constructing including selecting messages in the first plurality of messages that have undergone a recipient initiated message interaction event, wherein the message categorization dataset comprises, for each selected message from the identified subset, information identifying the message and information corresponding to a currently assigned message category for the message;
- training a message classifier using the message categorization dataset;
- after training the message classifier, classifying each message in a second plurality of messages using the message classifier by the one or more processors; and
- delivering the second plurality of messages to one or more recipients with a designation of a respective message category of each message in the second plurality of messages, as determined by the message classifier.

16. The computing system of claim 15, wherein the constructing the message categorization dataset further includes assigning a weight to each respective message in the plurality of messages based upon one or more recipient initiated message interaction events that are associated with the respective message.

17. The computer system of claim 16, wherein:
the assigning assigns a first value to the weight for a respective message when the one or more recipient initiated message interaction events for the respective message are positive interactions with respect to the original message category of the respective message; and
the assigning assigns a second value to the weight for the respective message when the one or more recipient initiated message interaction events for the respective message are negative interactions with respect to the original message category of the respective message.

18. The computer system of claim 16, wherein the weight is a weight on a continuous scale, and wherein the assigning assigns a value to the weight as a function of the one or more recipient initiated message interaction events associated with the respective message.

19. The computer system of claim 16, wherein assigning the weight is further based on an original classifier score for each respective message determined using a baseline message classifier different from the trained message classifier.

20. A non-transitory computer readable storage medium storing instructions for execution by one or more processors, the instructions, when executed, causing the one or more processors to perform a method of:
- collecting a plurality of recipient initiated message interaction events for messages in a first plurality of messages from a plurality of recipients, including a plurality of priority designation assignments and a plurality of message category change events in which a recipient has changed a category of a given message in the first plurality of messages from an original message category to an updated message category;
- identifying a subset of the first plurality of messages as having trusted message category assignments based on the plurality of recipient initiated message interaction events;
- constructing a message categorization dataset from the identified subset of the first plurality of messages, the constructing including selecting messages in the first plurality of messages that have undergone a recipient initiated message interaction event, wherein the message categorization dataset comprises, for each selected message from the identified subset, information identifying the message and information corresponding to a currently assigned message category for the message;
- training a message classifier using the message categorization dataset;
- after training the message classifier, classifying each message in a second plurality of messages using the message classifier by the one or more processors; and
- delivering the second plurality of messages to one or more recipients with a designation of a respective message category of each message in the second plurality of messages, as determined by the message classifier.

* * * * *